(12) United States Patent
Wang et al.

(10) Patent No.: US 11,403,799 B2
(45) Date of Patent: Aug. 2, 2022

(54) METHOD AND APPARATUS FOR RECOGNIZING FACE-SWAP, DEVICE AND COMPUTER READABLE STORAGE MEDIUM

(71) Applicant: Baidu Online Network Technology (Beijing) Co., Ltd., Beijing (CN)

(72) Inventors: Yang Wang, Beijing (CN); Junfeng Xiong, Beijing (CN); Zhonghou Lyu, Beijing (CN); Huan Zhang, Beijing (CN)

(73) Assignee: BAIDU ONLINE NETWORK TECHNOLOGY (BEIIING) CO., LTD, Beijing (CN)

( * ) Notice: Subject to any disclaimer, the term of this patent is extended or adjusted under 35 U.S.C. 154(b) by 0 days.

(21) Appl. No.: 17/171,669

(22) Filed: Feb. 9, 2021

(65) Prior Publication Data

US 2022/0092835 A1 Mar. 24, 2022

(30) Foreign Application Priority Data

Sep. 24, 2020 (CN) .......................... 202011016485.5

(51) Int. Cl.
| | |
|---|---|
| *G06T 11/60* | (2006.01) |
| *G06T 5/00* | (2006.01) |
| *G06K 9/62* | (2022.01) |
| *G06V 40/16* | (2022.01) |

(52) U.S. Cl.
CPC ............ *G06T 11/60* (2013.01); *G06K 9/6256* (2013.01); *G06T 5/004* (2013.01); *G06V 40/165* (2022.01); *G06V 40/166* (2022.01); *G06V 40/171* (2022.01)

(58) Field of Classification Search
CPC ....... G06T 11/60; G06T 5/004; G06K 9/6256; G06V 40/165; G06V 40/166; G06V 40/171
See application file for complete search history.

(56) References Cited

U.S. PATENT DOCUMENTS

| | | | |
|---|---|---|---|
| 2017/0032179 A1* | 2/2017 | Al-Qunaieer | G06V 40/168 |
| 2019/0238568 A1* | 8/2019 | Goswami | G06N 20/10 |
| 2021/0201544 A1* | 7/2021 | Miao | G06T 11/60 |

OTHER PUBLICATIONS

Dong, Xiaoyi & Bao, Jianmin & Chen, Dongdong & Zhang, Weiming & Yu, Nenghai & Chen, Dong & Wen, Fang & Guo, Baining. (Dec. 2020). Identity-Driven DeepFake Detection. (Year: 2020).*

* cited by examiner

*Primary Examiner* — Jennifer Mehmood
*Assistant Examiner* — Andrew Shin
(74) *Attorney, Agent, or Firm* — Seed IP Law Group LLP

(57) ABSTRACT

A method and apparatus for recognizing face-swap, a device and a computer readable storage medium are provided, and relates to the field of computer technology. An implementation of the method includes: performing face detection on a to-be-recognized image to determine a face area in the to-be-recognized image; extending the face area to a head area in the to-be-recognized image, to generate an image of the head area; occluding at least one part of the face area in the image of the head area, to obtain an occlusion image; and determining, based on the occlusion image and a pre-trained face-swap recognition model, a face-swap recognition result of the to-be-recognized image, the face-swap recognition model being used to determine whether a face in the to-be-recognized image is swapped with a preset face.

15 Claims, 5 Drawing Sheets

METHOD AND APPARATUS FOR RECOGNIZING FACE-SWAP, DEVICE AND COMPUTER READABLE STORAGE MEDIUM

CROSS-REFERENCE TO RELATED APPLICATIONS

This application claims priority to Chinese Patent Application No. 202011016485.5, filed with the China National Intellectual Property Administration (CNIPA) on Sep. 24, 2020, the content of which is incorporated herein by reference in its entirety.

TECHNICAL FIELD

The present disclosure relates to the field of computer technology, particularly to the fields of artificial intelligence, deep learning, and image processing, and more particularly to a method and apparatus for recognizing face-swap, device and a computer readable storage medium.

BACKGROUND

With the increasing popularity of automatic face-swap technology, users may use software having automatic face-swap function to replace face in an original video with face of a public figure to generate a synthetic video, causing public opinion influence of the public figure performing the behavior in the video. In this regard, a corresponding method for recognizing face-swap is needed to deal with the above improper usage scenario.

Existing face-swap recognition solutions may develop corresponding face-swap recognition models targeting at algorithms used for automatic face-swap. For example, by training a convolutional neural network model, the convolutional neural network model may recognize a face generated by a specified automatic face-swap algorithm and a real face. A to-be-recognized image is inputted into the trained convolutional neural network model. The model may output that the to-be-recognized image belongs to the face generated by the automatic face-swap algorithm, or that the to-be-recognized image belongs to a real face.

SUMMARY

A method and apparatus for recognizing face-swap, a device and a computer readable storage medium are provided.

According to a first aspect, a method for recognizing face-swap is provided, including: performing face detection on a to-be-recognized image, to determine a face area in the to-be-recognized image; extending the face area to a head area in the to-be-recognized image, to generate an image of the head area; occluding at least one part of the face area in the image of the head area, to obtain an occlusion image; and determining, based on the occlusion image and a pre-trained face-swap recognition model, a face-swap recognition result of the to-be-recognized image, the face-swap recognition model being used to determine whether a face in the to-be-recognized image is swapped with a preset face.

According to a second aspect, an apparatus for recognizing face-swap is provided, the apparatus includes: a face detection unit, configured to perform face detection on a to-be-recognized image, to determine a face area in the to-be-recognized image; a generation unit, configured to extend the face area to a head area in the to-be-recognized image, to generate an image of the head area; an occlusion unit, configured to occlude at least one part of the face area in the image of the head area, to obtain an occlusion image; and a face-swap recognition unit, configured to determine, based on the occlusion image and a pre-trained face-swap recognition model, a face-swap recognition result of the to-be-recognized image, the face-swap recognition model being used to determine whether a face in the to-be-recognized image is swapped with a preset face.

According to a third aspect, a device for recognizing face-swap is provided, the device includes: one or more processors; a storage apparatus, for storing one or more programs; and the one or more programs, when executed by the one or more processors, cause the one or more processors to implement the method for recognizing face-swap according to the first aspect.

According to a fourth aspect, a computer readable storage medium is provided, the medium stores a computer program thereon, the program, when executed by a processor, causes the processor to perform the method for recognizing face-swap according to the first aspect.

According to the technology of the present disclosure, a method for recognizing face-swap is provided, which can improve the generalization of face-swap recognition.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

The Accompanying Drawings are Used to Better Understand the Present Solution and do not Constitute a Limitation to the Present Disclosure, in which.

DETAILED DESCRIPTION OF EMBODIMENTS

The following describes example embodiments of the present disclosure with reference to the accompanying drawings, which include various details of embodiments of the present disclosure to facilitate understanding, and should be regarded as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
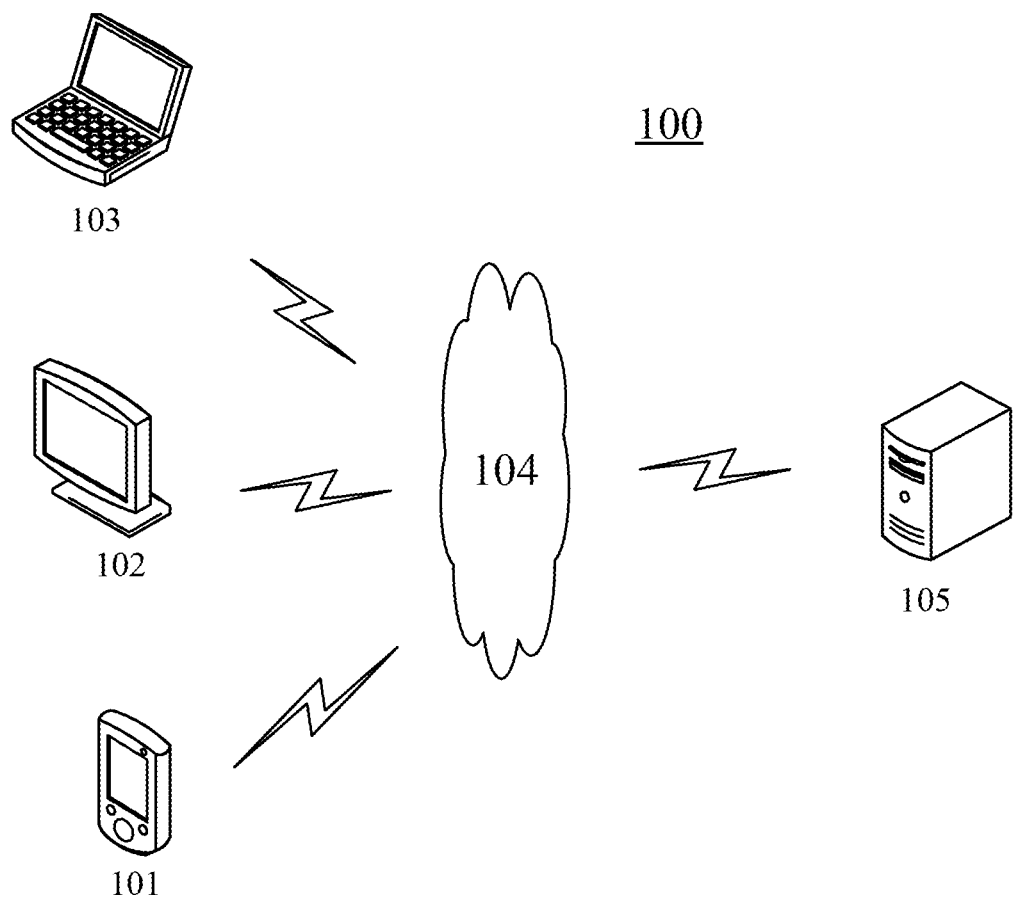
FIG. 1 is a diagram of an exemplary system architecture in which an embodiment of the present disclosure may be implemented.

FIG. 1 illustrates an exemplary system architecture 100 of a method for recognizing face-swap or an apparatus for recognizing face-swap in which an embodiment of the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may use the terminal devices 101, 102, 103 to interact with the server 105 through the network 104 to receive or send messages and the like. The terminal devices 101, 102, 103 may be electronic devices such as televisions, computers, or tablets, on which a to-be-recognized image including a face area may be stored. The to-be-recognized image may be a video frame in a video or another acquired image, which is not limited in the embodiments of the present disclosure. The user may send a locally stored video including a face to the server 105 through the network 104 using the terminal devices 101, 102, 103, so that the server 105 may recognize whether the face in the video is synthesized. Alternatively, the terminal devices 101, 102, and 103 may also recognize whether the face in the video is synthesized.

The terminal devices 101, 102, 103 may be hardware or software. When the terminal devices 101, 102, 103 are hardware, they may be various electronic devices, including but not limited to televisions, smart phones, tablet computers, E-book readers, vehicle-mounted computers, laptop portable computers, desktop computers and the like. When the terminal devices 101, 102, 103 are software, they may be installed in the above-listed electronic devices. They may be implemented as a plurality of software or software modules (for example, for providing distributed services), or as a single software or software module, which is not specifically limited herein.

The server 105 may be a server that provides various services. For example, the server acquires the video including the face stored in the terminal devices 101, 102, 103, and may perform face recognition on the video including the face. Specifically, the server may first detect a face area in the video, then perform expansion processing on the face area to generate a head area image, and then perform blocking processing on at least one part of the face area in the head area image to obtain a occlusion image, and may determine, based on the occlusion image and a pre-trained face-swap recognition model, whether the face in the video is replaced with a preset face of a target person.

It should be noted that the server 105 may be hardware or software. When the server 105 is hardware, it may be implemented as a distributed server cluster composed of a plurality of servers, or as a single server. When the server 105 is software, it may be implemented as a plurality of software or software modules (for example, for providing distributed services), or as a single software or software module, which is not specifically limited herein.

It should be noted that the method for recognizing face-swap provided in the embodiments of the present disclosure may be performed by the terminal devices 101, 102, 103, or by the server 105. Accordingly, the apparatus for recognizing face-swap may be provided in the terminal devices 101, 102, 103, or in the server 105.

It should be understood that the number of terminal devices, networks, and servers in FIG. 1 is merely illustrative. Depending on the implementation needs, there may be any number of terminal devices, networks, and servers.

Figure 2:
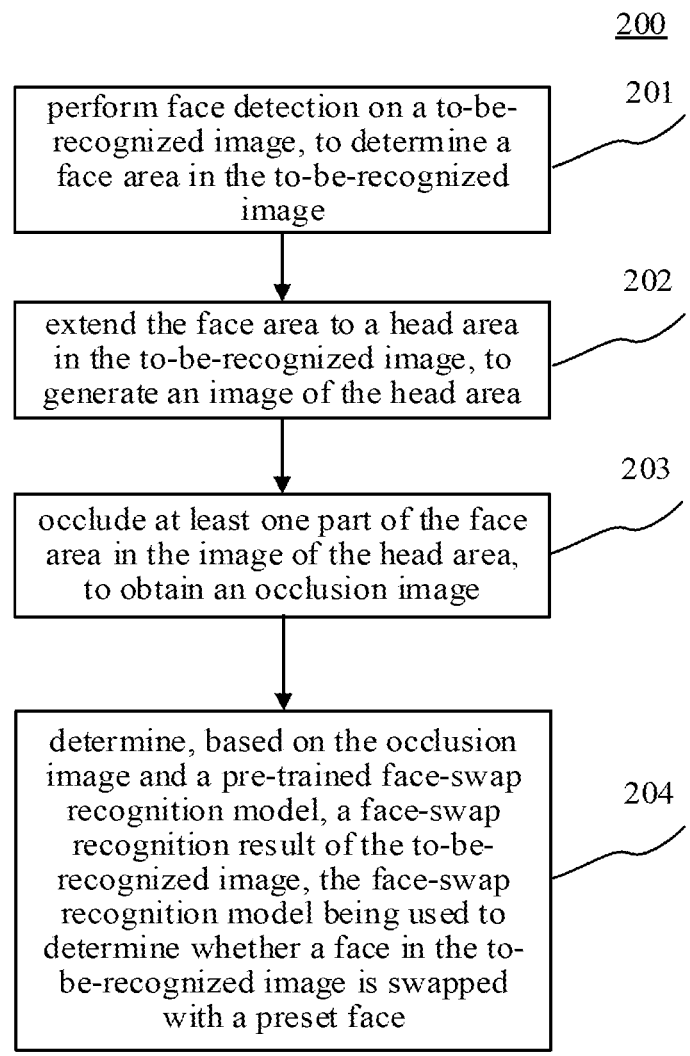
FIG. 2 is a flowchart of a method for recognizing face-swap according to an embodiment of the present disclosure.

With further reference to FIG. 2, illustrating a flow 200 of a method for recognizing face-swap according to an embodiment of the present disclosure. The method for recognizing face-swap includes the following steps:

Step 201, performing face detection on a to-be-recognized image to determine a face area in the to-be-recognized image.

In an embodiment, the to-be-recognized image may be an image frame captured from a video, or an image including a face, which is not limited herein. The face in the to-be-recognized image may be a preset face of a target person, or may also be a synthetic face synthesized based on facial features of the target person. The embodiment of the present disclosure may be used to recognize whether or not the face in the to-be-recognized image is a synthetic face obtained by synthesizing. In addition to the face, the to-be-recognized image may also include environment and background information, etc. In this regard, face detection may be performed on the to-be-recognized image to determine the face area in the to-be-recognized image.

Step 202, extending the face area to a head area in the to-be-recognized image, to generate an image of the head area.

In an embodiment, the face area recognized in step 201 is usually an area including eyes, eyebrows, nose, and mouth. In an embodiment of the present disclosure, after acquiring the face area, the face area may be extended to the head area in the to-be-recognized image, to generate the image of the head area, so that the image of the head area includes more features, such as ears, hair and other features.

Further, when performing extension processing on the face area, the face area may be extended outward on the to-be-recognized image by a preset range, for example, the face area may be extended by 1.3 times, or by other ranges such as the face area may be extended by 1.4 times or 1.5 times, which is not limited herein. Or, the face area may also be extended in at least one direction: the face area may be only extended upwards for a preset range, or may be only extended downwards for a preset range, or may be extended leftwards for a preset range, or extended rightwards for a preset range, or may be extended a corresponding range towards any combination of the above directions. The detail of the extension method is not limited herein. The purpose of the extension processing is to make the image of the head area include more periphery features, and any extension processing method may be used as long as the purpose of including more periphery features can be achieved.

Step 203, occluding at least one part of the face area in the image of the head area, to obtain an occlusion image.

In an embodiment, at least one part of the face area in the image of the head area may be occluded to obtain the occlusion image. Here, the at least one part of the face area may include the eyes, nose, mouth, eyebrows, etc. Alternatively, all the core areas in the face area may be occluded to obtain the occlusion image. In this regard, whether the face has been replaced with a preset face may be determined by recognizing features of the un-occluded parts in the occlusion image. Or, part of the core areas in the face area may also be occluded, for example, only the eyebrows and the eyes are occluded, but the recognition effect is not as good as that of all-core parts occlusion. Alternatively, the method of occluding may include occluding with a color, occluding with a preset pattern, occluding with mosaic, etc., which is not limited herein. For example, occluding with a color: the at least one part of the face area in the image of the head area may be occluded by a single color; occluding with a preset pattern: the at least one part of the face area in the image of the head area image may be occluded by a preset pattern; occluding with mosaic: the at least one part of the face area in the image of the head area may be occluded by mosaic, which is not limited herein.

Step 204, determining, based on the occlusion image and a pre-trained face-swap recognition model, a face-swap recognition result of the to-be-recognized image, the face-swap recognition model being used to determine whether a face in the to-be-recognized image is swapped with a preset face.

In an embodiment, the pre-trained face-swap recognition model is a model obtained by training with occlusion images of the preset face of the target person and occlusion images of other faces. The parameter input to the model may be an image, and the parameter output from the model may be a recognition result of whether the face in the image is replaced with the preset face. Particularly, the recognition result may be a confidence that the face in the image is the preset face, or the recognition result may also be the probability that the face in the image is not the preset face, etc., which is not limited herein. As long as the recognition result of whether the face in the to-be-recognized image is replaced with the preset face can be directly obtained based on the face-swap recognition result, the specific parameter output by the face-swap recognition model is not limited in embodiments of the present disclosure.

Figure 3:
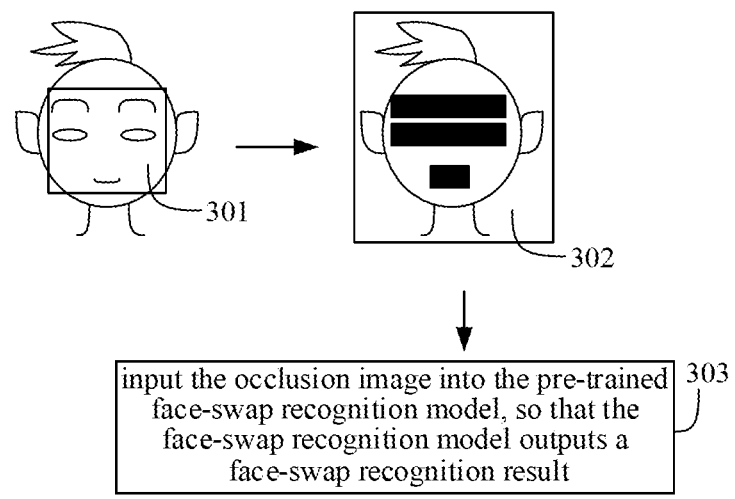
FIG. 3 is a schematic diagram of an application scenario of the method for recognizing face-swap according to an embodiment of the present disclosure.

With further reference to FIG. 3, a schematic diagram of an application scenario of the method for recognizing face-swap is illustrated. In the application scenario of FIG. 3, the method for recognizing face-swap may be applied to a scenario of face-swap detection for a specific person. First, a face-swap recognition model may be pre-trained so that the trained face-swap recognition model can recognize a preset face of the specific person. The preset face may be faces of one or more designated specific persons. Particularly, the specific persons may be well-known public figures, etc. Since usually face-swap algorithms replace some core areas to realize the face-swap, so that for face-swap recognition, it is possible to detect features of the parts that normally are not replaced by the face-swap algorithms to recognize whether face-swap is performed. In embodiments of the present disclosure, the training of the face-swap recognition model is to enable the model to recognize periphery features of the specific person, such as recognizing features such as hair style, hair color, neck, or ears of the specific person. By inputting an image to the trained face-swap recognition model, the face-swap recognition model may output the confidence that the face in the image is the preset face.

Assuming that there is a video of a public figure circulating on the Internet, a video frame containing the face of the public figure in the video may be acquired as a to-be-recognized image. By performing face detection on the to-be-recognized image, a face area 301 including the eyebrows, eyes, nose, and mouth of the face can be determined. Furthermore, the face area 301 may be extended to the head area in the to-be-recognized image, to generate an image of the head area. Here, the image of the head area may include features such as the person's ears and hair. Further, the eyebrows, eyes, nose, and mouth in the head area image may be occluded, such as occluding these parts with a single color to obtain an occlusion image 302. Further, step 303 may be performed to input the occlusion image into the pre-trained face-swap recognition model, so that the face-swap recognition model outputs a face-swap recognition result, for example, the confidence of that the public figure in the video frame is the public figure himself may be output.

The method for recognizing face-swap provided by embodiments of the present disclosure, may perform face detection on a to-be-recognized image to determine a face area in the to-be-recognized image, extend the face area to the head area in the to-be-recognized image to generate an image of the head area, occlude at least one part of the face area in the image of the head area to obtain an occlusion image, and may determine, based on the occlusion image and a pre-trained face-swap recognition model, a face-swap recognition result of the to-be-recognized image. By recognizing un-occluded periphery features in the occlusion image, it may be determined whether the face in the to-be-recognized image is a synthetic face. This process does not need to develop corresponding face-swap identification models for the algorithms used for automatic face-swap. It only needs to recognize the face periphery features to determine whether it is a synthetically generated face, which may be applied to face images generated by various automatic face-swap algorithms, thereby improving the generalization of face-swap recognition.

Figure 4:
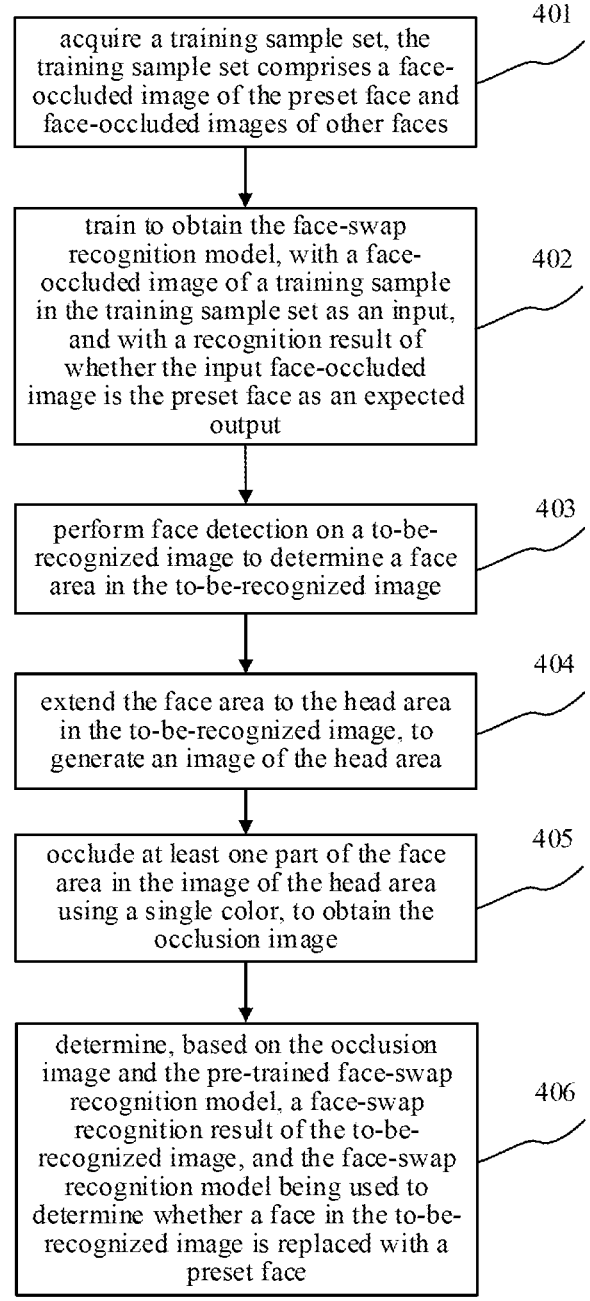
FIG. 4 is a flowchart of the method for recognizing face-swap according to another embodiment of the present disclosure.

With further reference to FIG. 4, illustrating a flow 400 of a method for recognizing face-swap according to another embodiment of the present disclosure. As shown in FIG. 4, the method for recognizing face-swap of the present embodiment may include the following steps:

Step 401, acquiring a training sample set, the training sample set comprises a face-occluded image of the preset face and face-occluded images of other faces.

In an embodiment, the training sample set may include a face-occluded image of the preset face and the face-occluded images of other faces. The preset face may be the face of a specific person, such as the face of a specific public figure, and other faces may be faces of persons other than the specific person. Positive samples and negative samples are constructed using face-occluded images of the preset face and the face-occluded images of other faces, to train the model to recognize the preset face.

In some alternative implementations of the present embodiment, the acquiring a training sample set includes: acquiring a sample face image including the preset face and sample face images including other faces; performing face detection on each acquired sample face image to determine sample face areas; extending each sample face area to a sample head area in the each acquired sample face image, to obtain an image of each sample head area; and occluding at least one part of the sample face area in the image of the each sample head area, to obtain the face-occluded image including the preset face and the face-occluded images including other faces.

In this implementation, the method for acquiring a face-occluded image including a preset face and face-occluded images including other faces is the same as the above steps 201 to 203, and detailed description thereof will be omitted.

In some alternative implementations of the present embodiment, the extending each sample face area to a sample head area in the each acquired sample face image, to obtain an image of each sample head area, includes: determining key point coordinates of the sample face area; obtaining a sample head area based on the key point coordinates; and obtaining the sample head area image including the sample head area, based on the sample head area.

In this implementation, in the process of extending the sample face area to obtain the image of the sample head area, face alignment may be performed, face alignment refers to the process of determining coordinates of key points distributed in the sample face area. The key points in the face area includes the eyes, nose, eyebrows, etc. that distributed across the face are. During extending the face area, the sample head area may be determined based on coordinate extension of the coordinates of the key points. coordinate extension includes perform coordinate transformation on the coordinates, so that compared with the area constituted by the initial coordinates, the area constituted by the transformed coordinates is extended by a preset range. Then based on the sample head area, the image of the sample head area including the sample head area may be obtained. Alternatively, methods such as left-right flipping, rotation, or translation may also be used to further expand the data set of the image of the sample head area image, so that the acquired image of the sample head area has a higher accuracy.

Step 402, training to obtain the face-swap recognition model, with a face-occluded image of a training sample in the training sample set as an input, and with a recognition result of whether the input face-occluded image is the preset face as an expected output.

In the present embodiment, the face-swap recognition model may be a classifier constructed using a deep neural network or a support vector machine. When the number of the preset face is one, a binary classifier may be obtained by training so that the classifier recognizes that the input image is the preset face or that the classifier recognizes that the input image is not the preset face; and when the number of the preset face is more than one, a multi-class classifier may be obtained by training so that the classifier recognizes which preset face that the input image includes, which is not limited herein. For the training of the face-swap recognition model, the face-swap recognition model may be obtained by training with the face-occluded images of the training samples as the input and with the recognition results of whether the face-occluded image are the preset face as the expected outputs, the parameters of the model is continuously adjusted to train to obtain the face-swap recognition model. Here, the face-occluded images of the training samples include face-occluded images of the preset face and the face-occluded images of other faces. A face-occluded image of the preset face may be used as a positive sample, and the face-occluded images of other faces may be used as negative samples. The face-swap recognition model is trained based on the positive samples and the negative samples, so that the face-swap recognition model can distinguish the face-occluded image of the preset face and the face-occluded images of other faces.

Step 403, performing face detection on a to-be-recognized image to determine a face area in the to-be-recognized image.

Step 404, extending the face area to the head area in the to-be-recognized image, to generate an image of the head area.

Step 405, occluding at least one part of the face area in the image of the head area using a single color, to obtain the occlusion image.

In the present embodiment, a single color may be used to occlude at least one part of the face area in the image of the head area, where the single color may be any color. When at least one part of the face area in the image of the head area is occluded using a single color, an obtained occlusion image can mainly highlight periphery features in the image of the head area. The periphery features may include but are not limited to hair, chin, ears, etc., which are not limited in embodiments of the present disclosure.

Step 406, determining, based on the occlusion image and the pre-trained face-swap recognition model, a face-swap recognition result of the to-be-recognized image, and the face-swap recognition model being used to determine whether a face in the to-be-recognized image is replaced with a preset face.

In some alternative implementations of the present embodiment, after occluding at least one part of the face area in the image of the head area using a single color to obtain the occlusion image, the following steps may also be performed: determining a target un-occluded feature in the occlusion image; the determining, based on the occlusion image and the pre-trained face-swap recognition model, a face-swap recognition result of the to-be-recognized image may include: determining the face-swap recognition result of the to-be-recognized image, based on the target un-occluded feature and the pre-trained face-swap recognition model. By this alternative implementation, the target un-occluded feature in the occlusion image may be used as an input parameter of the model. Similarly, in this case, in the process of training the face-swap recognition model, un-occluded features in the preset face and un-occluded features of other faces may also be used as input parameters of the model, so that the face-swap recognition model can be trained to recognize the periphery features in the head area of the specific person. Using this method, the accuracy of the recognizing a periphery feature may be further improved.

The method for recognizing face-swap provided by above embodiments of the present disclosure, may train the face-swap recognition model based on the face-occluded image of the preset face and the face-occluded images of other faces, so that the face-swap recognition model can recognize the face periphery features in the face-occluded images and determine whether the face in the image is the preset face, improving the accuracy of the face-swap recognition model for face-swap recognition. Further, by determining the key point coordinates of the sample face area, performing extension processing on the sample face area, the data set may be expanded, further improving the accuracy of model training. In addition, a single color may also be used to occlude at least one part of the face area in the image of the head area to obtain the occlusion image, so that the model can acquire the periphery features in the un-occluded areas in the occlusion image more quickly, which improves the efficiency of model recognition.

Figure 5:
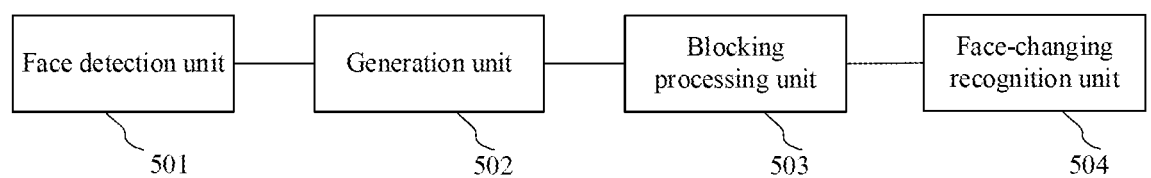
FIG. 5 is a schematic structural diagram of an apparatus for recognizing face-swap according to an embodiment of the present disclosure.

With further reference to FIG. 5, as an implementation of the method shown in the above figures, an embodiment of the present disclosure provides an apparatus for recognizing face-swap, and the apparatus embodiments corresponds to the method embodiments as shown in FIG. 2. The apparatus may be specifically applied to various electronic devices.

As shown in FIG. 5, an apparatus 500 for recognizing face-swap of the present embodiment includes: a face detection unit 501, a generation unit 502, an occlusion unit 503 and a face-swap recognition unit 504.

The face detection unit 501 is configured to perform face detection on a to-be-recognized image to determine a face area in the to-be-recognized image.

The generation unit 502 is configured to extend the face area to a head area in the to-be-recognized image, to generate an image of the head area.

The occlusion unit 503 is configured to occlude at least one part of the face area in the image of the head area, to obtain an occlusion image.

The face-swap recognition unit 504 is configured to determine, based on the occlusion image and a pre-trained face-swap recognition model, a face-swap recognition result of the to-be-recognized image, the face-swap recognition model being used to determine whether a face in the to-be-recognized image is swapped with a preset face.

In some alternative implementations of the present embodiment, the apparatus further includes: a face-swap recognition model training unit, configured to acquire a training sample set, where the training sample set comprises a face-occluded image of the preset face and face-occluded images of other faces; and train to obtain the face-swap recognition model, with a face-occluded image of a training sample in the training sample set as an input, and with a recognition result of whether the input face-occluded image is the preset face as an expected output.

In some alternative implementations of the present embodiment, the face-swap recognition model training unit is further configured to: acquire a sample face image including the preset face and sample face images including other faces; perform face detection on each acquired sample face image to determine sample face areas; extend each sample face area to a sample head area in the each acquired sample face image, to obtain an image of each sample head area; and occlude at least one part of the sample face area in the image of the each sample head area, to obtain the face-occluded image including the preset face and the face-occluded images including other faces.

In some alternative implementations of the present embodiment, the face-swap recognition model training unit is further configured to: determine key point coordinates of the sample face area; obtain a sample head area based on the key point coordinates; and obtain the sample head area image including the sample head area, based on the sample head area.

In some alternative implementations of the present embodiment, the blocking processing unit 503 is further configured to: occlude at least one part of the face area in the image of the head area image using a single color, to obtain the occlusion image.

It should be understood that the units 501 to 504 recorded in the apparatus 500 for recognizing face-swap respectively correspond to the steps in the method described with reference to FIG. 2. Therefore, the operations and features described above for the method for recognizing face-swap are also applicable to the apparatus 500 and the units contained therein, and detailed description thereof will be omitted.

According to an embodiment of the present disclosure, a device for recognizing face-swap and a readable storage medium are provided.

Figure 6:
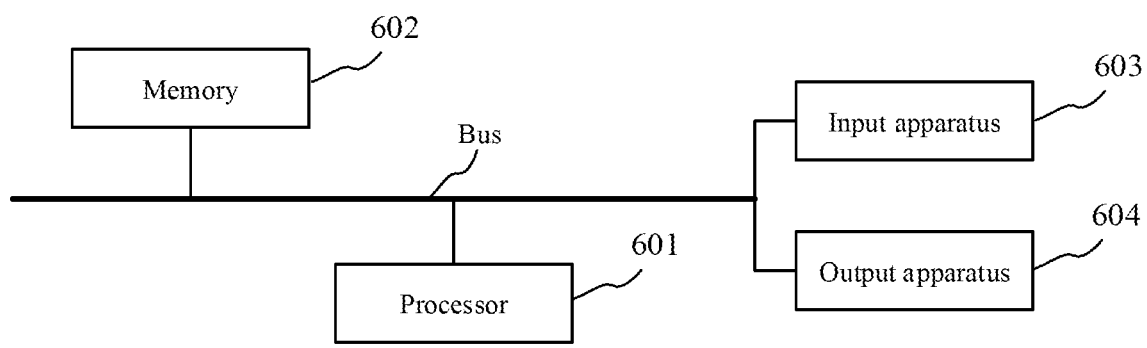
FIG. 6 is a block diagram of a device used to implement the method for recognizing face-swap according to embodiments of the present disclosure.

As shown in FIG. 6, a block diagram of a device used to implement the method for recognizing face-swap according to embodiments of the present disclosure is illustrated. The device for recognizing face-swap is intended to represent various forms of digital computers, such as laptop computers, desktop computers, workbenches, personal digital assistants, servers, blade servers, mainframe computers, and other suitable computers. The device for recognizing face-swap may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the device for recognizing face-swap includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the device for recognizing face-swap, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of device for recognizing face-swap may be connected, and the devices provide some necessary operations, for example, as a server array, a set of blade servers, or a multi-processor system. In FIG. 6, one processor 601 is used as an example.

The memory 602 is a non-transitory computer readable storage medium provided by the present disclosure. The memory stores instructions executable by at least one processor, so that the at least one processor performs the method for recognizing face-swap provided by the present disclosure. The non-transitory computer readable storage medium of the present disclosure stores computer instructions for causing a computer to perform the method for recognizing face-swap provided by the present disclosure.

The memory 602, as a non-transitory computer readable storage medium, may be used to store non-transitory software programs, non-transitory computer executable programs and modules, such as program instructions/modules corresponding to the method for recognizing face-swap in the embodiments of the present disclosure (for example, the face detection unit 501, the generation unit 502, the blocking processing unit 503 and the face-swap recognition unit 504 as shown in FIG. 5). The processor 601 executes the non-transitory software programs, instructions, and modules stored in the memory 602 to execute various functional applications and data processing of the server, that is, to implement the method for recognizing face-swap in the foregoing method embodiments.

The memory 602 may include a storage program area and a storage data area, where the storage program area may store an operating system and at least one function required application program; and the storage data area may store data created by the use of the device for recognizing face-swap. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the device for recognizing face-swap through a network. Examples of the above network include but are not limited to the Internet, intranet, local area network, mobile communication network, and combinations thereof.

The device for recognizing face-swap may further include: an input apparatus 603 and an output apparatus 604. The processor 601, the memory 602, the input apparatus 603, and the output apparatus 604 may be connected through a bus or in other methods. In FIG. 6, connection through the bus is used as an example.

The input apparatus 603 may receive input digital or character information, and generate key signal inputs related to user settings and function control of the electronic device for storing data, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution of embodiments of the present disclosure, a method for recognizing face-swap is provided, which can improve the generalization of face-swap recognition.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for recognizing face-swap, the method comprising:
   performing face detection on a to-be-recognized image, to determine a face area in the to-be-recognized image;
   extending the face area to a head area in the to-be-recognized image, to generate an image of the head area;
   occluding at least one part of the face area in the image of the head area, to obtain an occlusion image; and
   determining, based on the occlusion image and a pre-trained face-swap recognition model, a face-swap recognition result of the to-be-recognized image, the pre-trained face-swap recognition model being used to determine whether a face in the to-be-recognized image is swapped with a preset face.

2. The method for recognizing face-swap according to claim 1, wherein the pre-trained face-swap recognition model is obtained through:
   acquiring a training sample set, wherein the training sample set comprises a face-occluded image of the preset face and face-occluded images of other faces; and
   training to obtain the pre-trained face-swap recognition model, with a face-occluded image of a training sample in the training sample set as an input, and with a recognition result of whether the input face-occluded image is the preset face as an expected output.

3. The method for recognizing face-swap according to claim 2, wherein the acquiring the training sample set comprises:
   acquiring a sample face image including the preset face and sample face images including other faces;

performing face detection on each acquired sample face image to determine sample face areas;

extending each sample face area to a sample head area in the each acquired sample face image, to obtain an image of each sample head area; and occluding at least one part of the sample face area in the image of the each sample head area, to obtain the face-occluded image including the preset face and the face-occluded images including other faces.

4. The method for recognizing face-swap according to claim 3, wherein the extending each sample face area to the sample head area, to obtain the image of each sample head area, comprises:

determining key point coordinates of the sample face area;

obtaining a sample head area based on the key point coordinates; and obtaining the image of the sample head area including the sample head area, based on the sample head area.

5. The method for recognizing face-swap according to claim 1, wherein the occluding at least one part of the face area in the image of the head area image to obtain the occlusion image, comprises:

occluding at least one part of the face area in the image of the head area image using a single color, to obtain the occlusion image.

6. A device for recognizing face-swap, the device comprising: one or more processors; and a storage apparatus, storing one or more programs thereon, the one or more programs, when executed by the one or more processors, cause the one or more processors to perform operations comprising:

performing face detection on a to-be-recognized image, to determine a face area in the to-be-recognized image;

extending the face area to a head area in the to-be-recognized image, to generate an image of the head area;

occluding at least one part of the face area in the image of the head area, to obtain an occlusion image; and determining, based on the occlusion image and a pre-trained face-swap recognition model, a face-swap recognition result of the to-be-recognized image, the pre-trained face-swap recognition model being used to determine whether a face in the to-be-recognized image is swapped with a preset face.

7. The device according to claim 6, wherein the pre-trained face-swap recognition model is obtained through:

acquiring a training sample set, wherein the training sample set comprises a face-occluded image of the preset face and face-occluded images of other faces; and training to obtain the pre-trained face-swap recognition model, with a face-occluded image of a training sample in the training sample set as an input, and with a recognition result of whether the input face-occluded image is the preset face as an expected output.

8. The device according to claim 7, wherein the acquiring the training sample set comprises:

acquiring a sample face image including the preset face and sample face images including other faces;

performing face detection on each acquired sample face image to determine sample face areas;

extending each sample face area to a sample head area in the each acquired sample face image, to obtain an image of each sample head area; and occluding at least one part of the sample face area in the image of the each sample head area, to obtain the face-occluded image including the preset face and the face-occluded images including other faces.

9. The device according to claim 8, wherein the extending each sample face area to the sample head area, to obtain the image of each sample head area, comprises:

determining key point coordinates of the sample face area;

obtaining a sample head area based on the key point coordinates; and obtaining the image of the sample head area including the sample head area, based on the sample head area.

10. The device according to claim 6, wherein the occluding at least one part of the face area in the image of the head area image to obtain the occlusion image, comprises:

occluding at least one part of the face area in the image of the head area image using a single color, to obtain the occlusion image.

11. A non-transitory computer readable medium, storing a computer program thereon, the program, when executed by a processor, causes the processor to perform operations comprising:

performing face detection on a to-be-recognized image, to determine a face area in the to-be-recognized image;

extending the face area to a head area in the to-be-recognized image, to generate an image of the head area;

occluding at least one part of the face area in the image of the head area, to obtain an occlusion image; and determining, based on the occlusion image and a pre-trained face-swap recognition model, a face-swap recognition result of the to-be-recognized image, the pre-trained face-swap recognition model being used to determine whether a face in the to-be-recognized image is swapped with a preset face.

12. The medium according to claim 11, wherein the pre-trained face-swap recognition model is obtained through:

acquiring a training sample set, wherein the training sample set comprises a face-occluded image of the preset face and face-occluded images of other faces; and training to obtain the pre-trained face-swap recognition model, with a face-occluded image of a training sample in the training sample set as an input, and with a recognition result of whether the input face-occluded image is the preset face as an expected output.

13. The medium according to claim 12, wherein the acquiring the training sample set comprises:

acquiring a sample face image including the preset face and sample face images including other faces;

performing face detection on each acquired sample face image to determine sample face areas;

extending each sample face area to a sample head area in the each acquired sample face image, to obtain an image of each sample head area; and occluding at least one part of the sample face area in the image of the each sample head area, to obtain the face-occluded image including the preset face and the face-occluded images including other faces.

14. The medium according to claim 13, wherein the extending each sample face area to the sample head area, to obtain the image of each sample head area, comprises:

determining key point coordinates of the sample face area;

obtaining a sample head area based on the key point coordinates; and obtaining the image of the sample head area including the sample head area, based on the sample head area.

15. The medium according to claim 11, wherein the occluding at least one part of the face area in the image of the head area image to obtain the occlusion image, comprises:

occluding at least one part of the face area in the image of the head area image using a single color, to obtain the occlusion image.

\* \* \* \* \*